United States Patent [19]

Oshitani et al.

[11] Patent Number: 4,985,318
[45] Date of Patent: Jan. 15, 1991

[54] ALKALINE BATTERY WITH A NICKEL ELECTRODE

[75] Inventors: Masahiko Oshitani; Keiichi Hasegawa; Hiroshi Yufu, all of Takatsuki, Japan

[73] Assignee: Yuasa Battery Co., Ltd., Takatsuki, Japan

[21] Appl. No.: 358,118

[22] Filed: May 30, 1989

[30] Foreign Application Priority Data

Jul. 19, 1988 [JP] Japan .................................. 63-180047
Oct. 18, 1988 [JP] Japan .................................. 63-262047

[51] Int. Cl.$^5$ ............................................. H02M 4/32
[52] U.S. Cl. .................................... 429/223; 252/182.1
[58] Field of Search ....................... 429/223; 252/182.1

[56] References Cited

U.S. PATENT DOCUMENTS

| | | | |
|---|---|---|---|
| 4,016,091 | 4/1977 | Jackovitz et al. | 429/233 X |
| 4,399,005 | 8/1983 | Fritts et al. | 204/2.1 |
| 4,628,593 | 2/1986 | Fritts et al. | 429/223 X |

Primary Examiner—Stephen J. Kalafut
Attorney, Agent, or Firm—Armstrong, Nikaido, Marmelstein, Kubovcik & Murray

[57] ABSTRACT

A nickel electrode for an alkaline battery comprises a porous alkaline-proof metal fiber substrate used as a current collector, and active material for the electrode. The active material includes nickel hydroxide powder active material, to which zinc or magnesium is added at a rate in a range of 3–10 wt % or 1–3 wt %, respectively. The zinc and magnesium is in a solid solution in crystal of the nickel hydroxide, and the active material forms principle compound of paste, which is loaded in the electrode.

7 Claims, 12 Drawing Sheets

FIG. 1
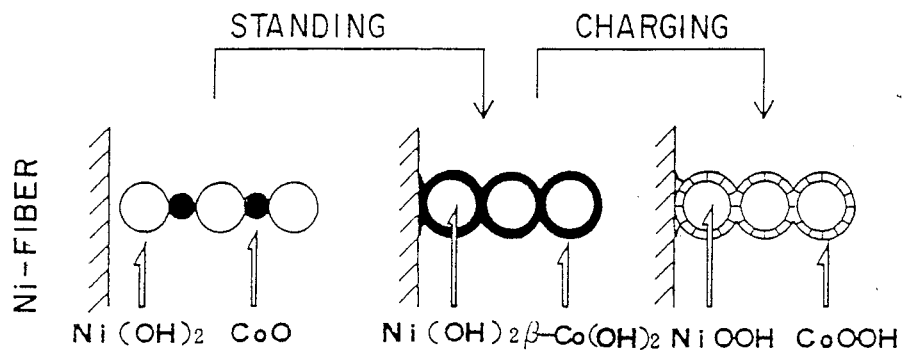
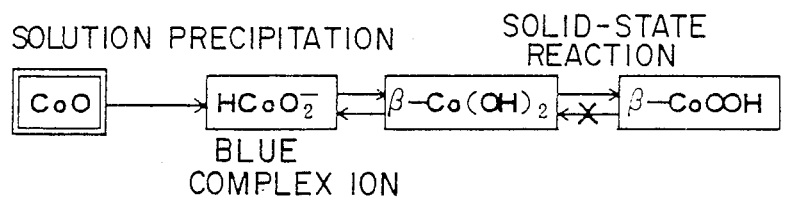
FIG. 2
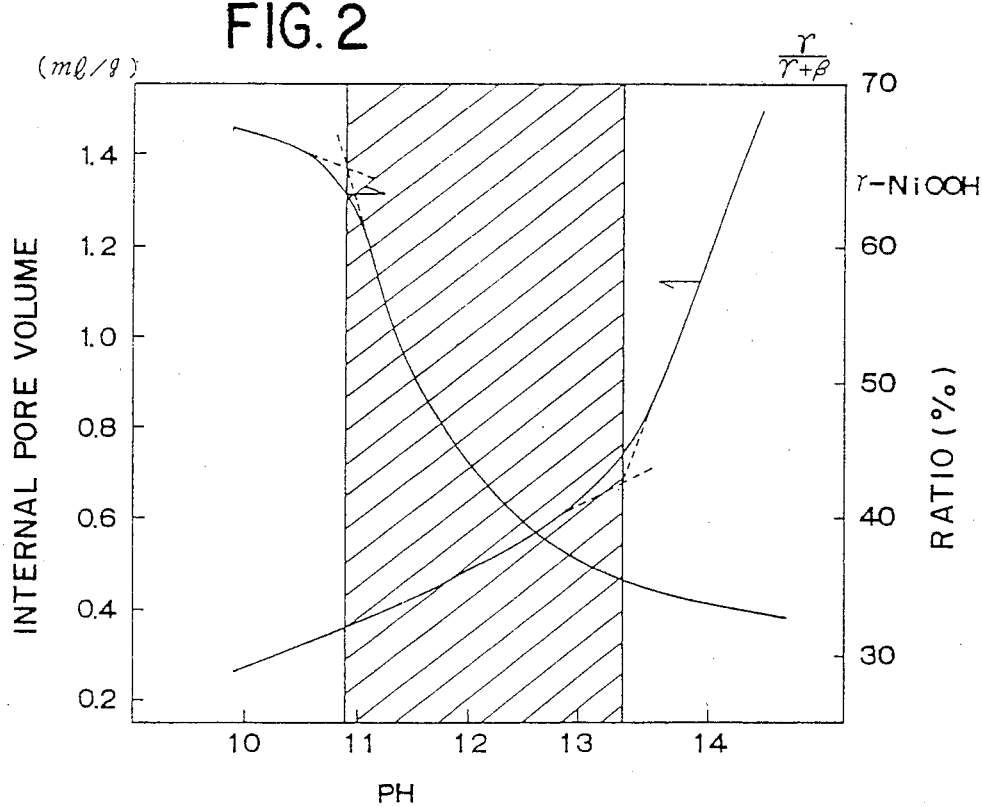

B.E.T. AREA   TOTAL PORE VOLUME

|   | m²/g | mℓ/g |
|---|------|------|
| G | 66.28 | 0.136 |
| F | 21.25 | 0.028 |

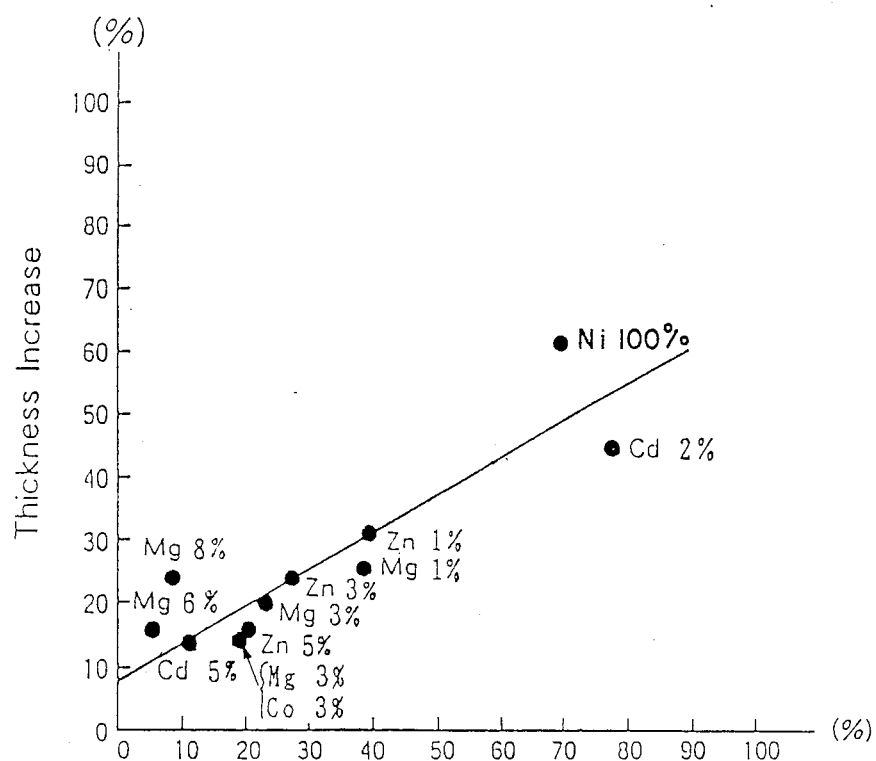
FIG. 17  $\frac{\gamma}{\gamma+\beta} \times 100$
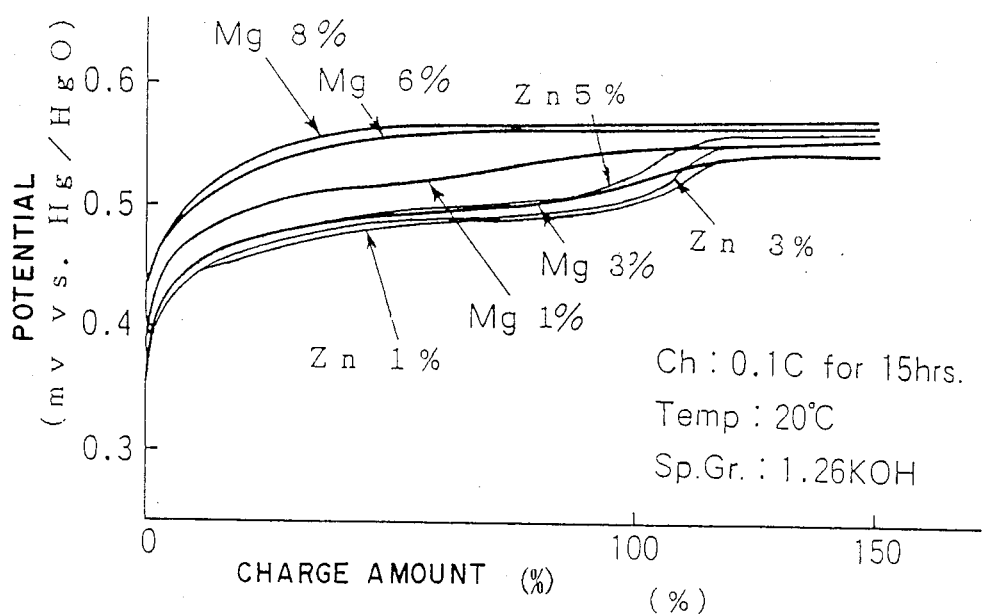
FIG. 18

ALKALINE BATTERY WITH A NICKEL ELECTRODE

BACKGROUND OF THE INVENTION (1) Field of the Invention

The present invention relates to an alkaline battery with a nickel electrode, and particularly to the alkaline battery and the nickel electrode as well as active material for the nickel electrode.

(2) Description of the Prior Art

Alkaline batteries commonly used are called as sintered batteries, and have structures in which nickel hydroxide is loaded in a micro-porous substrate formed of a perforated steel sheet to which nickel powder is sintered. The electrode of this type requires repetition of active material loading processes for several times, resulting in complicated and thus expensive manufacturing process. Further, since the porosity of the substrate is restricted, loading density of the active material, is low, and thus an energy density of the electrode can be approximately 400 mAh/cc at most.

In attempt to improve this, electrodes other than that of the sintered type have been broadly developed. In an example of them, graphite powder of about 20-30 wt% (weight percentage) is mixed as conductive additive with nickel hydroxide powder coated with cobalt hydroxide, and then, this mixture is formed into a sheet-like shape and is fixedly pressed to a nickel plate to form the electrode. Since the above conductive additive itself does not contribute to capacity of the electrode, it reduces capacity density, and causes generation of a large amount of carbonate due to decomposition of the graphite. Therefore, this electrode can not be used in batteries having small amount of electolyte, such as sealed nickel cadmium batteries. In order to overcome the above disadvantages, manufacturers start to provide pasted nickel electrodes for practical use, in which a metal fiber substrate having a high porosity of about 95% is used. In these electrodes, CoO powder, which forms conductive network for the active material, is added to the nickel hydroxide powder active material which is produced from nickel sulfate aqueous solution and sodium hydroxide aqueous solution, and viscous aqueous solution of carboxymethyl-cellulose is further added thereto to form paste, which is loaded in the fiber substrate. This conductive network forms current paths which are more effective than those by graphite, does not decompose, and thus does not produce carbonate. This electrode is less expensive than the sintered electrode, and has high energy density of about 500 mAh/cc.

However, as weights of portable electronics equipment have recently been reduced, the high energy density of about 600 mAh/oc is required in the market. In order to comply with this requirement, the density of the nickel hydroxide power itself must be increased, because the porosity of the substrate is limited. The nickel hydroxide powder of the high density has been used as a part of material for parkerizing steel plates. In the manufacturing thereof, nickel nitrate or nickel sulfate is dissolved in weak basic ammonia acqueous solution and is stabilized as tetra-amine nickel (II) complex ion, and the nickel hydroxide is deposited while adding sodium hydroxide aqueous solution to it. This deposition is slowly performed so as to prevent development of voids in particles.

Since this method does not perform random deposition, as is done in the conventional method, it can produce the nickel hydroxide having good crystallinity with less grain boundary, i.e., less pore volume, and thus a high density.

However, due to the unique characteristics, this powder causes some problem when used as the active material for the battery as it is.

For example, the charge-discharge reaction of the nickel hydroxide electrode is performed by free movement of proton in the crystal of the nickel hydroxide. However, due to the high density of the nickel hydroxide and thus to the high compactness of the crystal, the free movement of the proton in the crystal is restricted. Further, since the current density increases in accordance with the reduction of the specific surface area, a large amount of higher oxide $\gamma$-NiOOH may be produced, which may cause fatal phenomena such as stepped discharge characteristics and/or swelling. The swelling due to the production of $\gamma$-NiOOH in the nickel electrode is caused by the large change of the density from high density $\beta$-NiOOH to low density $\gamma$-NiOOH. The inventors have already found that the production of $\gamma$-NiOOH can effectively be prevented by addition of a small amount of cadmium in a solid solution into the nickel hydroxide. However, it is desired to achieve the substantially same or more excellent effect by utilizing additive other than the cadmium from the viewpoint of the environmental pollution.

Accordingly, it is an object of the invention to provide active material for nickel electrode, in which the density of the nickel hydroxide is increased, and the production of $\gamma$-NiOOH, which may be caused due to the increased density, can be prevented by less poisonous additive, so that the useful life may be extended and the utilization factor of the active material may be improved. It is also an object of the invention to provide a nickel electrode utilizing said active material and an alkaline battery utilizing it.

SUMMARY OF THE INVENTION

According to the invention, active material for a nickel electrode comprises nickel hydroxide powder active material, and zinc or magnesium which is added to said active material at a rate in a range of 3-10 wt% or 1-3 wt%, respectively, said zinc and magnesium being in a solid solution in crystal of said nickel hydroxide, and in distribution of pore radii calculated from the a desorption side at nitrogen adsorption isotherm of said powder, development of pore having a radius of 30 Å or more being prevented, and an entire pore volume rate being controlled at 0.05 ml/g or less.

Further, according to the invention, a nickel electrode comprises a porous alkaline-proof metal fiber substrate used as a current collector; and active material for the electrode; said active material including; nickel hydroxide powder active material, to which zinc or magnesium is added at a rate in a range of 3-10 wt% or 1-3 wt%, respectively, said zinc and magnesium being in a solid solution in crystal of said nickel hydroxide; and said active material forming principle compound of paste, which is loaded in said electrode.

The nickel hydroxide having a high density, i.e., having a minimum inner pore volume, causes the production of a large amount of the higher oxide $\gamma$-NiOOH. However, the inventors have found that metal ion of different sorts, particularly zinc ion or magnesium ion located in the crystal of the nickel hydroxide can suppress production of γ-NiOOH.

At the outside of the nickel hydroxide, in order to improve the conductivity between the active material particles and the current collector, the cobalt compound powder may be mixed therewith and dissolved in the battery electrolyte, and then may be deposited between the current collector and the active material particles by virtue of the reaction of ($HCoO_2 \rightarrow \beta\text{-}Co(OH)_2$) prior to charging. When charged, by virtue of electrochemical oxidation by a reaction of ($\beta\text{-}Co(OH)_2 \rightarrow CoOOH$), it changes into highly conductive cobalt oxyhydroxide, whereby the flow of the electron can flow smoothly between the nickel fiber of the current collector and the particles of the nickel hydroxide, resulting in increase of the utilization factor. This reaction is illustrated in a modelled form in FIG. 1. As shown therein, the important feature of this is that it is kept standing after the electrolyte is supplied, and the cobalt compound powder electrode is dissolved so as to interconnect the current collector nickel fiber and the active material.

BRIEF DESCRIPTION OF THE DRAWINGS

FIG. 1 is a schematic view illustrating dissolving of cobalt compound in modelled form;

FIG. 2 is a diagram illustrating a relationship between pH of deposition solution, particle pore volume and ratio of γ-NiOOH:

FIG. 17 is a diagram illustrating a relationship between the ratio of γ-NiOOH and thickness of the electrode when the active material including various conditions of additives are used in the electrodes and they are overcharged;

FIG. 18 is a diagram illustrating charge potential characteristics of the electrodes including various amount of magnesium additives;

DETAILED DESCRIPTION OF THE PREFERRED EMBODIMENTS

A first embodiment of the invention will be detailed hereinafter.

Ammonium sulfate is added to aqueous solution of nickel sulfate to which a small amount of zinc sulfate was added to stabilize ion of nickel and zinc as ammine complex ion.

This solution is dropped into sodium hydroxide aqueous solution, while rapidly stirring it, to gradually decompose the complex ion and thus deposit and grow nickel hydroxide particles including the zinc in a solid solution state. This deposition is gradually performed in the weak alkaline solution of about pH 11-13 and the temperature in a range of about 40°-50° C. Depending on the pH of the deposition solution, the nickel hydroxide particles having various characteristics can be obtained.

In FIG. 2, there is shown a relationship between pore volume of powder consisting of only nickel hydroxide and ratio of γ-NiOOH.

As the pH is lower, the pore volume becomes smaller, and thus the powder has the high density. On the other hand, there is tendency that as the powder is produced at lower pH, more γ-NiOOH is produced. A region satisfying the above two factors is a hatched region between the respective inflection points, which is in a range of about pH 11-13.

Figure 3:
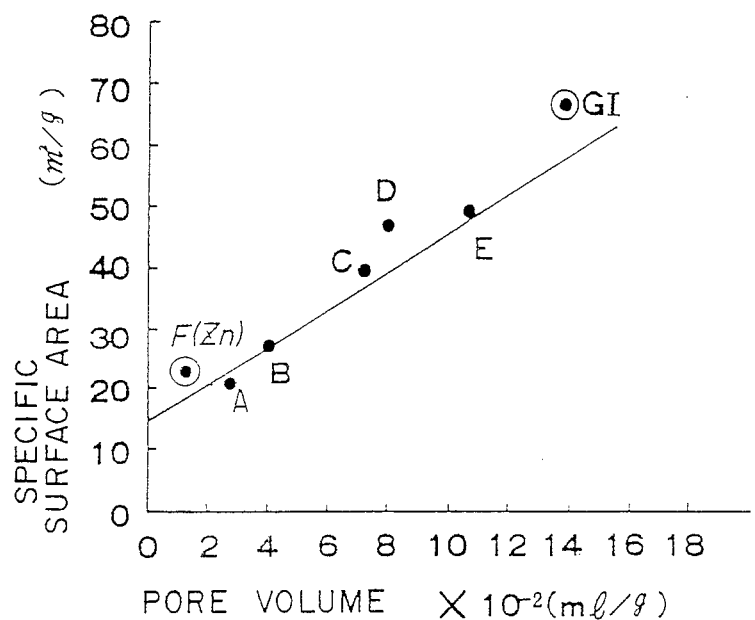
FIG. 3 is a diagram illustrating a relationship between specific surface area and pore volume of nickel hydroxide.

FIG. 3 illustrates a relationship between the pore volume and specific surface area. As the pH of the deposition solution is changed, the pore volume of nickel hydroxide changes, and at the same time, the specific surface area changes. Specimens A-E consists of only the nickel hydroxide, a specimen F contains additive of zinc in the solid solution, and a specimen G consists of only the nickel hydroxide produced by the conventional method.

In the above conventional method, the nickel hydroxide particles are deposited in alkaline aqueous solution of high concentration of pH 14 or more, without adding ammonium sulfate.

Each specimen shows the random particle deposition and the tendency that the pore volume in the particle increases in accordance with the increase of the specific surface area. Thus, there is correlation between the specific surface area and the pore volume, and independently of compound, the material having less pore volume and thus high density has less specific surface area.

Figure 4:
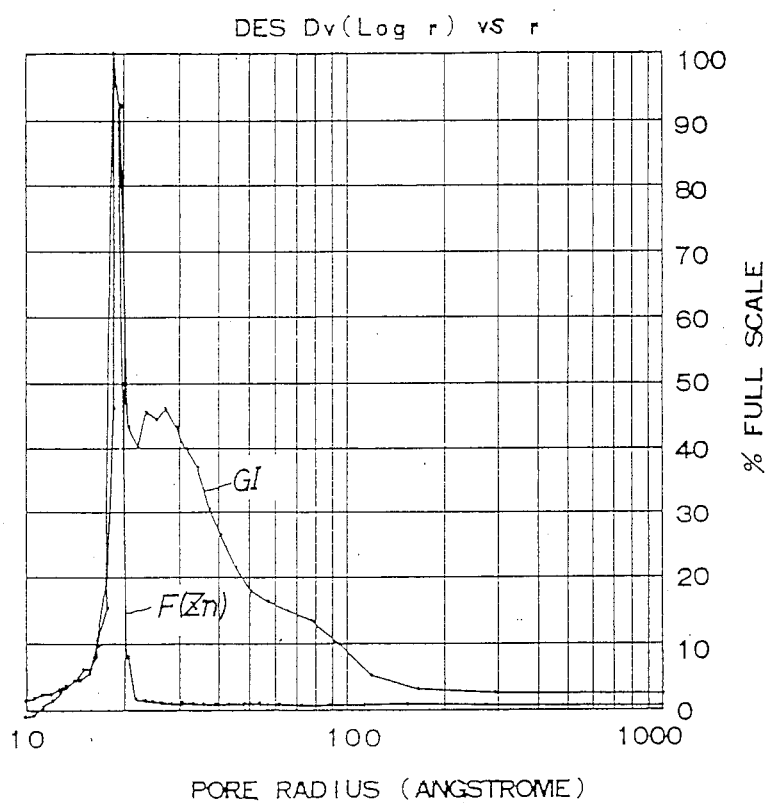
FIG. 4 is a diagram illustrating curves of pore size distribution of the conventional nickel hydroxide powder and that according to the invention.

FIG. 4 illustrates dispersion of pore radii of the nickel hydroxide according to the conventional method and the high density nickel hydroxide according to the invention, which is obtained from a desorption side at nitrogen absorption isotherm.

The nickel hydroxide GI according to the conventional method, is deposited by dropping the nickel sulfate solution into the sodium hydroxide aqueous solution having a high concentration, of which pH is 14.5 and the temperature is about 50° C.

Pore exists at a large amount in a wide range of the pore radius from 15–100 Å at the specific surface area of about 65 m$^2$/g therein. The particle has the pore volume of 0.15 ml/g, which is as much as 30%–40% of the particle volume (0.41 ml/g), and thus has a large void rate. In contrast to this, the nickel hydroxide F according to the invention has the small pore volume of 0.03 ml/g, which is only a quarter of that of said particle GI. This indicates that the particle F(Zn) the density higher by 20%–30% than the particle GI. This indicates that the specific area and the void volume should must be as small as possible to obtain the active material of the high density. The nickel hydroxide is mixed with a small amount of powder of cobalt compound such as CoO, $\alpha$-Co(OH)$_2$, $\beta$-Co(OH)$_2$, or cobalt acetate, which produces Co(II) complex ion when dissolved in alkaline electrolyte. Then, aqueous solution including carboxymethyl-cellulose of 1% is added at the ratio of 30 wt% thereto to produce flowable paste liquid. A predetermined amount of this paste liquid is loaded into alkaline-proof metal fiber substrate, e.g., nickel fiber substrate, having porosity of 95%, and a nickel electrode is formed by drying the substrate after the loading.

Figure 5:
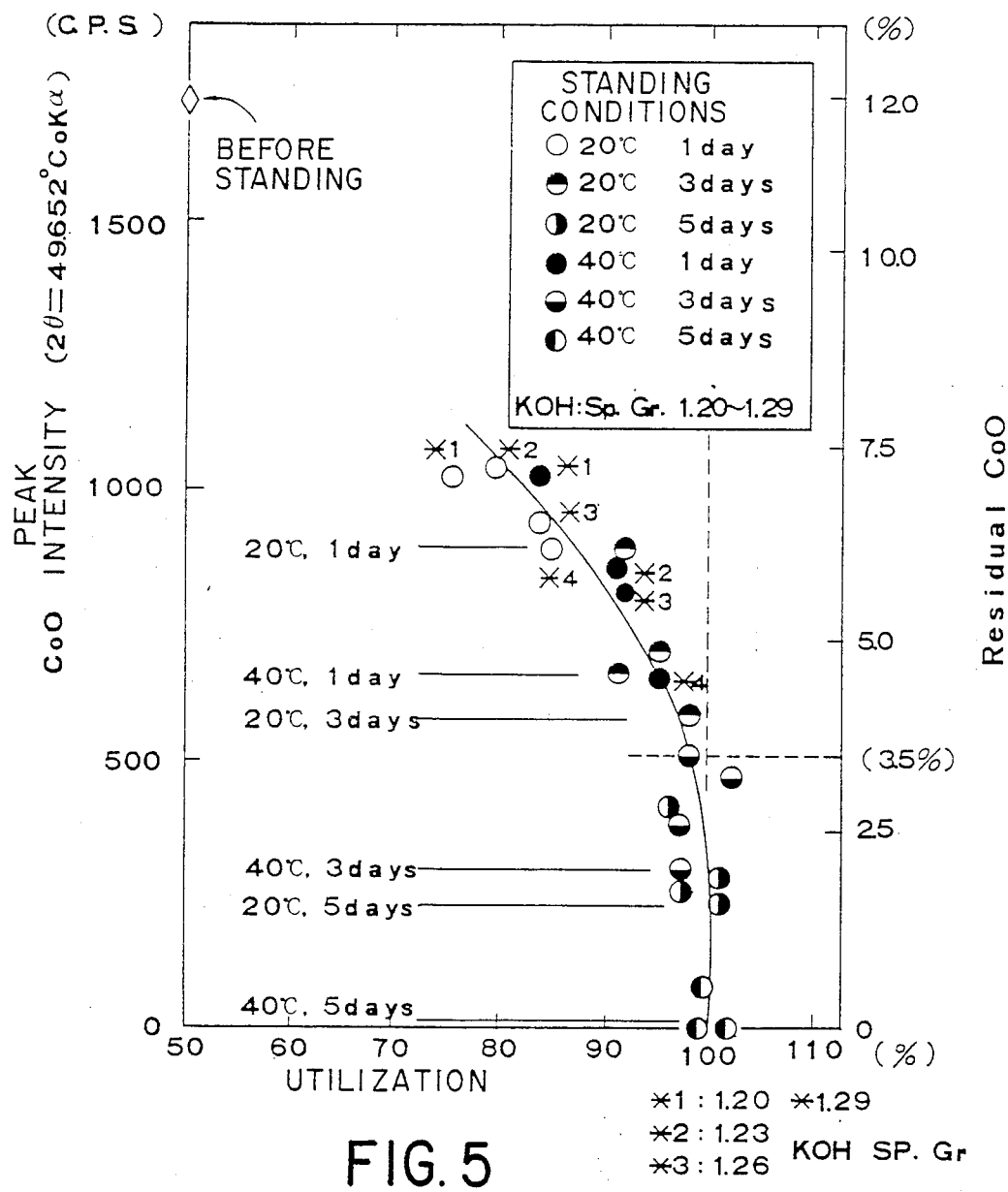
FIG. 5 is a diagram illustrating a relationship between standing conditions and an active material utilization factor.

In order to recognize the active material utilization factor as well as the ratio of $\gamma$-NiOOH by charge and discharge, a battery is assembled, in which this nickel electrode and a cadmium electrode are used with nonewoven cloth polypropylene separator therebetween, and potassium aqueous electrolyte having a specific gravity of 1.27 is added thereto. After the adding of the electrolyte, the battery is kept standing without supplying the electric current at the corrosion potential of the mixed cobalt compound, and interconnection is established in the nickel hydroxide powder by $\beta$-Co(OH)$_2$. FIG. 5 illustrates a relationship between the standing conditions of the nickel electrode and the active material utilization in the battery which includes the nickel hydroxide having the specific surface area of 65 m$^2$/g and CoO as the additive. With respect to the condition for the standing, which is process for the formation of the important conductive network, it can be seen that the high utilization can be obtained in a shorter period as the concentration of the electrolyte and the temperature increase. It can also be seen that the amount of the dissolved CoO also effectively functions. This is caused by the uniform dispersability of CoO by the complete dissolution deposition of the additive, i.e., by the formation of the more uniform network.

Figure 6:
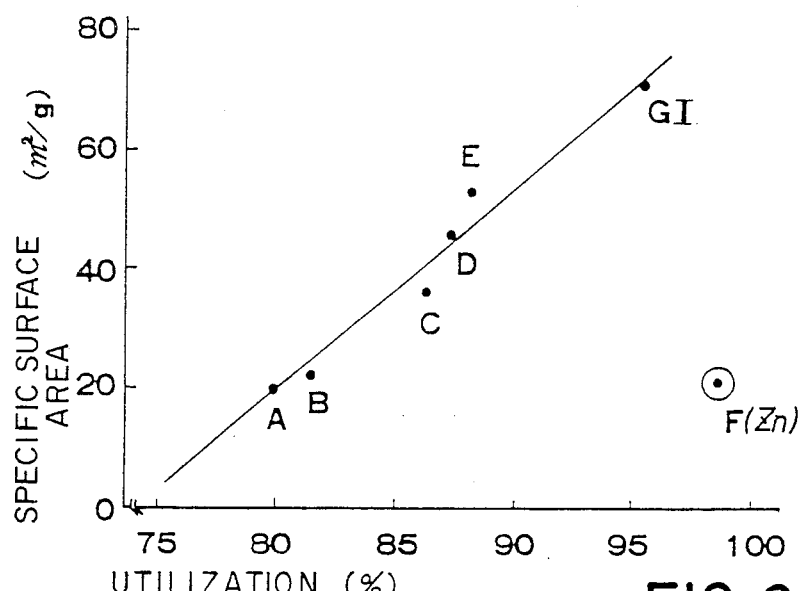
FIG. 6 is a diagram illustrating a relationship between various conditions of nickel hydroxides and an active material utilization.
Figure 7:
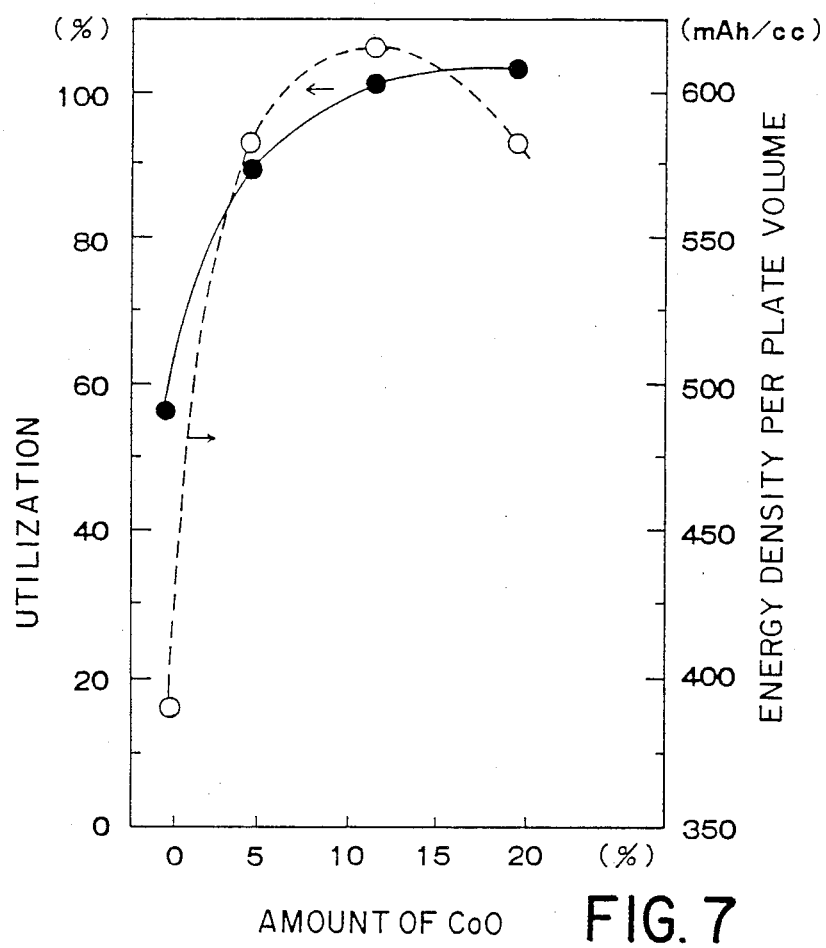
FIG. 7 is a diagram illustrating a relationship between an addition ratio of CoO, an active material utilization factor and a energy density per volume of a plate.

In FIG. 6, there is shown the relationship between the various conditions of nickel hydroxides and the utilization of the active material under the appropriate standing condition. The active material consisting of only the nickel hydroxide represents a proportional relationship between the specific surface area and the active material utilization. This fact shows that the high or large specific surface area is required for the high active material utilization. This means that the low density active material having the large pore volume is preferable in view of the aforementioned result, and thus it is impossible to increase the energy density of the electrode. However, the specimen F(Zn) including a small amount of zinc added into the crystal of the nickel hydroxide shows the high utilization which is substantially same as that of the conventional powder GI, in spite of the fact that it has the small specific surface area. The energy density per unit volume of the plate is 504 mAh/cc in the conventional powder GI, and 620 mAh/cc in the high density powder F(Zn), which is higher by 20% than the conventional powder GI. This indicates the fact that a large amount of the high density powder can be loaded in the substrate having the same volume, as compared with the conventional powder. Since the active material utilization factor is close to the theoretical value, the pore volume of the high density active material powder at the time of paste loading, which is required for satisfying the energy density of 600 mAh/cc, must be 0.05 ml/g or less. This effect by the addition of the zinc can be inferred to be caused by the form of the crystal of the nickel oxyhydroxide, because a large amount of $\gamma$-NiOOH having low reversibility is produced when it has a low utilization and a small amount of $\gamma$-NiOOH is produced when the zinc is added. For the reaction of the active material, it is necessary to permit smooth movement of the electron from the current collector to the surfaces of the active material particles, and it is essential to form the network of the conductive CoOOH particles in the isolated condition, in which they exist on the particle surfaces without being solid-solved in the nickel hydroxide, as described before. With respect to the CoO additive forming this network, if the amount thereof is increased, the active material utilization rate increases. Thus, although the more additive can establish the more perfect network, there is a tendency that the energy density of the plate decreases from the value of about 15%, because the additive itself contributes only to the conductivity, and neither practically charge nor discharge.

Correlation between the composition of the nickel hydroxide powder and the ratio of $\gamma$-NiOOH is inspected by a X-ray analysis of the plate at the end of the charge, which has been performed at high current density of 1C.

Figure 8:
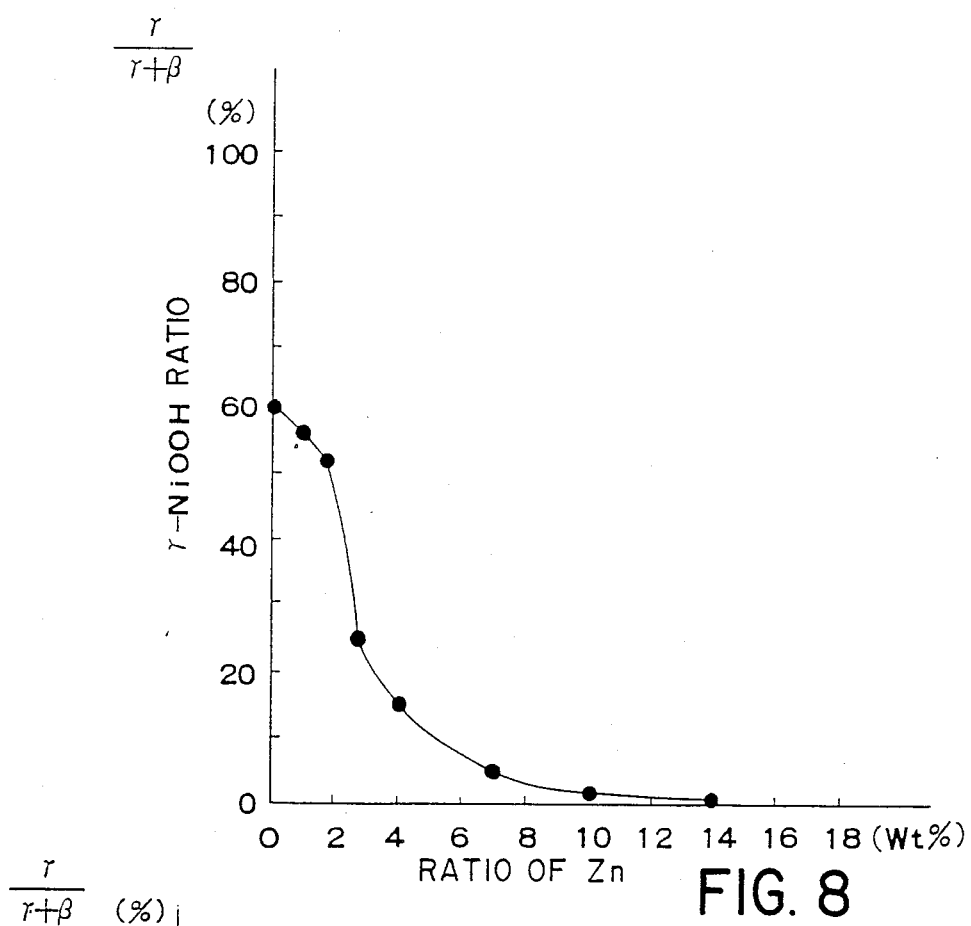
FIG. 8 is a diagram illustrating a relationship between an addition ratio of zinc and a ratio of NiOOH.
Figure 9:
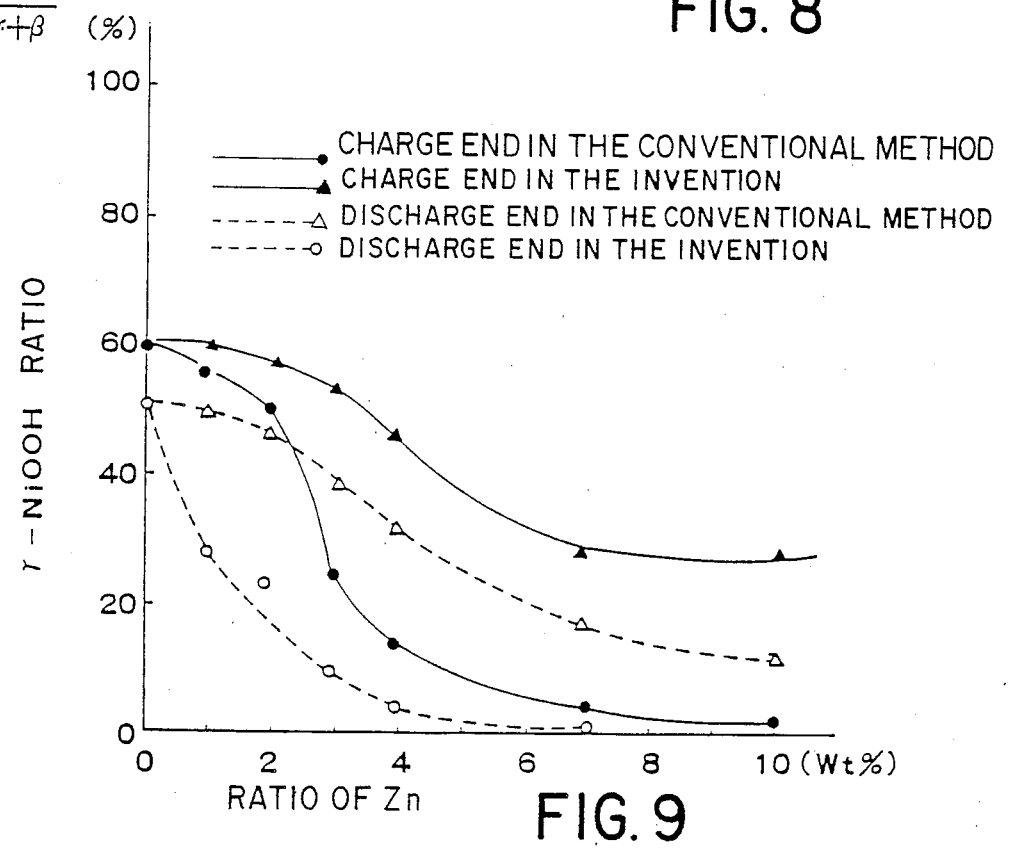
FIG. 9 is a diagram illustrating a ratio of γ-NiOOH at the end of discharge of various conditions of nickel hydroxides.

From FIG. 8, it can be seen that when the zinc (or magnesium) in the solid solution is added to the crystal of the nickel hydroxide, the ratio of $\gamma$-NiOOH decreases in proportion to the increase of the addition rate.

Although $\gamma$-NiOOH can be more effectively suppressed when the addition ratio is increased, excessively large ratio causes isolation, resulting in reduction of the utilization factor.

The isolated zinc hydroxide exists, and mixture of the dissolved zinc complex ion and cobalt complex ion is deposited in the course of the dissolving and re-depositing of the cobalt oxide additive, which deteriorates the conductivity, and thus the utilization. If the zinc is added at the ratio of 10 wt% or more, it is not solid-solved.

Figure 10:
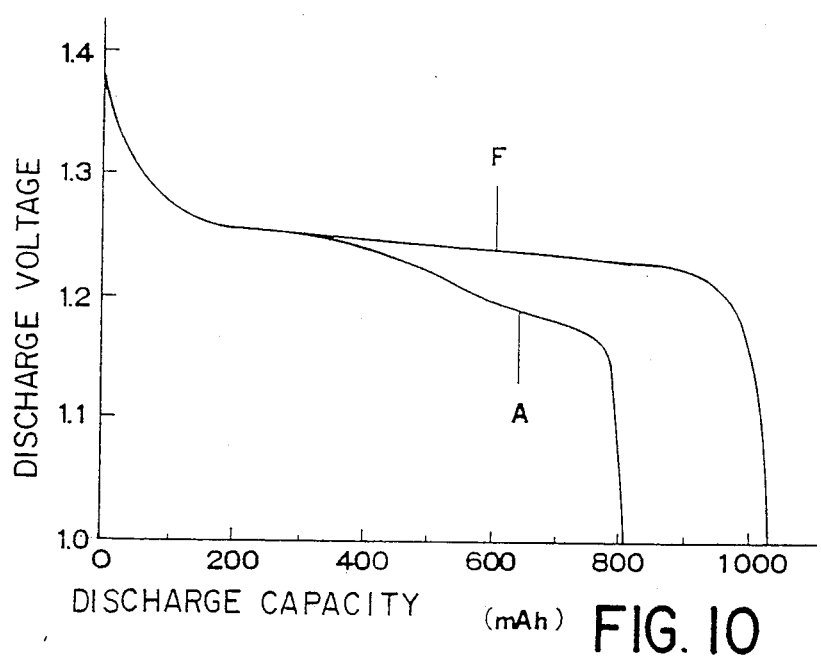
FIG. 10 is a diagram for comparing discharge voltage characteristics of the electrode including a large amount of γ-NiOOH and that according to the invention.

High density powder A without the zinc in FIG. 10 has a discharge voltage different from that of the high density powder F(Zn), due to production of a large amount of $\gamma$-NiOOH, and represents stepped discharge characteristics, as shown in FIG. 10. As shown in FIG. 8, the effect for preventing the production of $\gamma$-NiOOH is achieved by the addition of zinc of 3% or more, and $\gamma$-NiOOH completely extinguishes at the addition of 10%.

Figure 11:
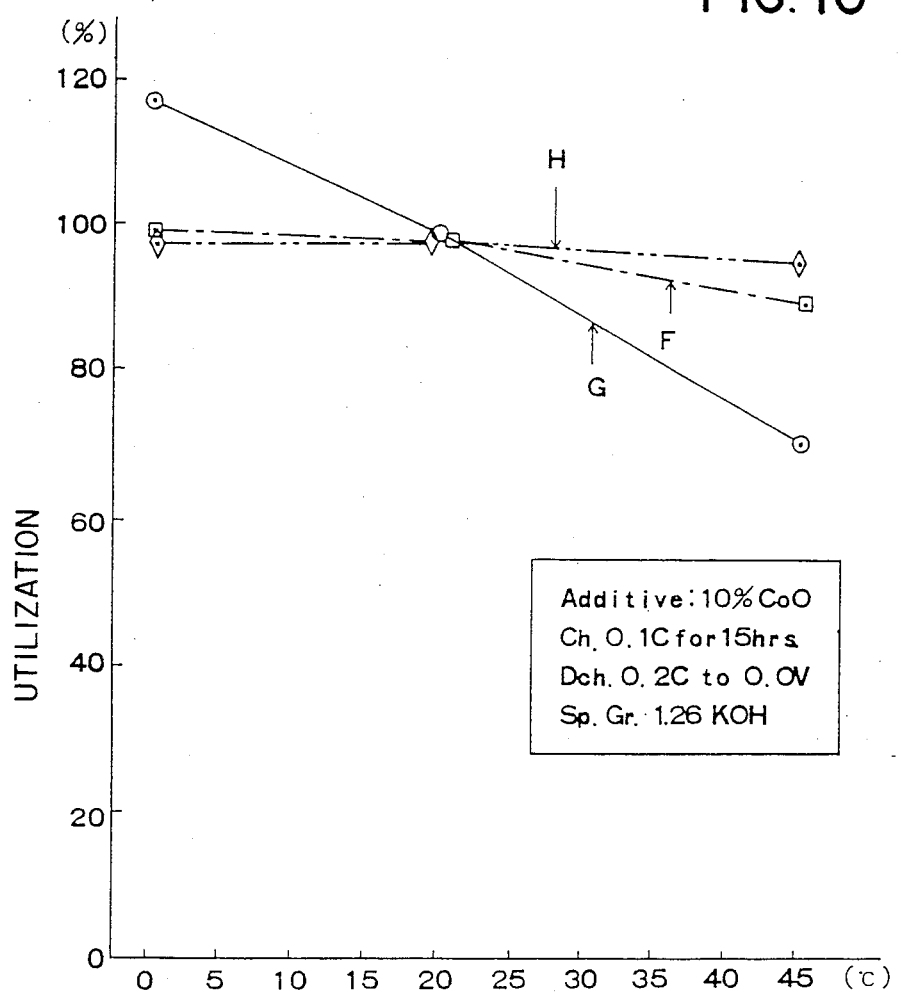
FIG. 11 is a diagram illustrating a relationship between the active material, charge/discharge temperature and active material utilization.
Figure 12:
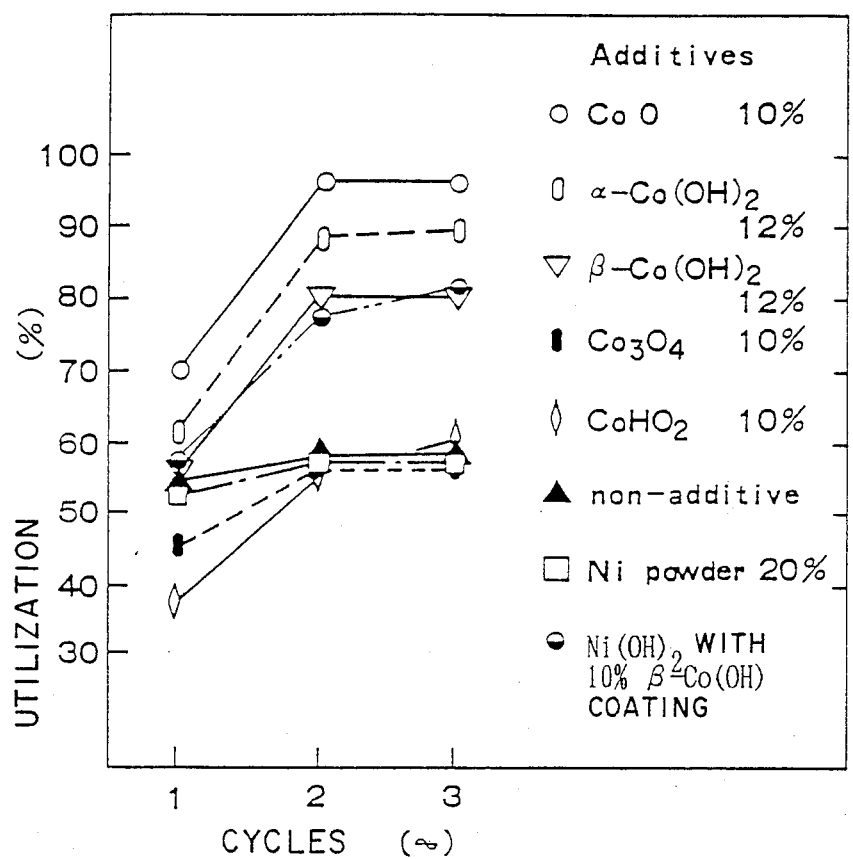
FIG. 12 is a diagram illustrating a relationship between various conditions of cobalt compound additive and the active material utilization.

This effect of the zinc can be maintained even if different element, e.g., cobalt, coexists in the solid solution. FIG. 11 illustrates a relationship between the active material, charge-discharge temperature and active material utilization. Further, in the material H, to which both the zinc and cobalt are added in the solid solution, there is another advantage that the charge performance is improved in a high temperature of about 45° C., as compared with the material F(Zn) including only the zinc. FIG. 12 illustrates a relationship of the active material utilization with respect to the additives for forming the network of CoOOH.

The reason that the order of the active material utilization is $CoO > \alpha\text{-Co(OH)}_2 > \beta\text{-Co(OH)}_2$ is considered to be based on the solubility in the eleotrolyte. That is; $\beta\text{-Co(OH)}_2$ is prone to be oxidized by the oxygen dissolved in the supplied electrolyte into brown $Co(OH)_3$ having low solubility. On the other hand, with respect to $\alpha\text{-Co(OH)}_2$, it changes through $\beta\text{-Co(OH)}_2$, i.e., $\alpha\text{-Co(OH)}_2 \to \beta\text{-Co(OH)}_2$), so that $Co(HO)_3$ is less prone to be produced. With respect to CoO, $Co(OH)_3$ (this can be represented by $CoOH_2$) is not produced at all, and thus is considered to be the most superior additive. Specifically, in view of the solution speed, it is desirable to form the additive having low crystallinity, which is heated and formed in hot inert atmosphere at a temperature between 200° C. and 800° C., using $\beta\text{-Co(OH)}_2$ as starting material.

The electrode having loaded paste, which is formed by immersing the nickel hydroxide powder in $HCoO_2^-$ ion and forming the cobalt hydroxide layer on the surfaces of the particles, has the utilization which is less than that of the electrode including CoO powder mixed therein and is nearly same as that of the electrode including $\beta\text{-Co(OH)}_2$ powder mixed therein. Further, the utilization is also investigated in another electrode. This electrode includes powder which forms conductive CoOOH layer on the surface of the oxyhydroxide powder, which is specifically formed by removing nickel fiber, i.e., current collector, from electrode including the CoO powder mixed therein after charging and discharging it. This powder is re-loaded in a form of paste thereon. This electrode is found to have the low utilization. This indicates a very important matter. Thus, it is essential that the conductive network (CoOOH) between the active material and the current collector is formed in the manufactured electrode. If CoOOH layer is pre-formed on the surfaces of the active material particles, the perfect network can not be established. Therefore, it is essential to provide a standing step for performing the dissolving and re-deposition of the CoO powder after the assembly of the electrode in the battery. invention, using the CoO additive, the utilization can be increased to a high value close to the theoretical value by the dissolving and re-deposition process, without using additional conductive material, so that the conductive additive is unnecessary, and thus the formation of the carbonate, which may be caused due to oxidation decomposition, can be prevented, and it can be used in the electrode for the sealed nickel cadmium battery.

Then, a second embodiment of the invention will be detailed hereinafter.

Ammonium sulfate is added to aqueous solution of nickel sulfate to which a small amount of magnesium sulfate was added to produce ammine complex ion of nickel and magnesium.

This solution is dropped into sodium hydroxide aqueous solution, while rapidly stirring it, to gradually decompose the complex ion and thus deposit and grow nickel hydroxide particles including the magnesium in a solid solution state. This deposition is gradually performed in the weak alkaline solution of about pH 11-13 and the temperature in a range of about 40°-50°C. Depending on the pH of the deposition solution, the nickel hydroxide particles having various characteristics can be obtained.

The characteristics of this nickel hydroxide are same or similar to those, which are previously described with reference to FIGS. 2 and 3.

Figure 13:
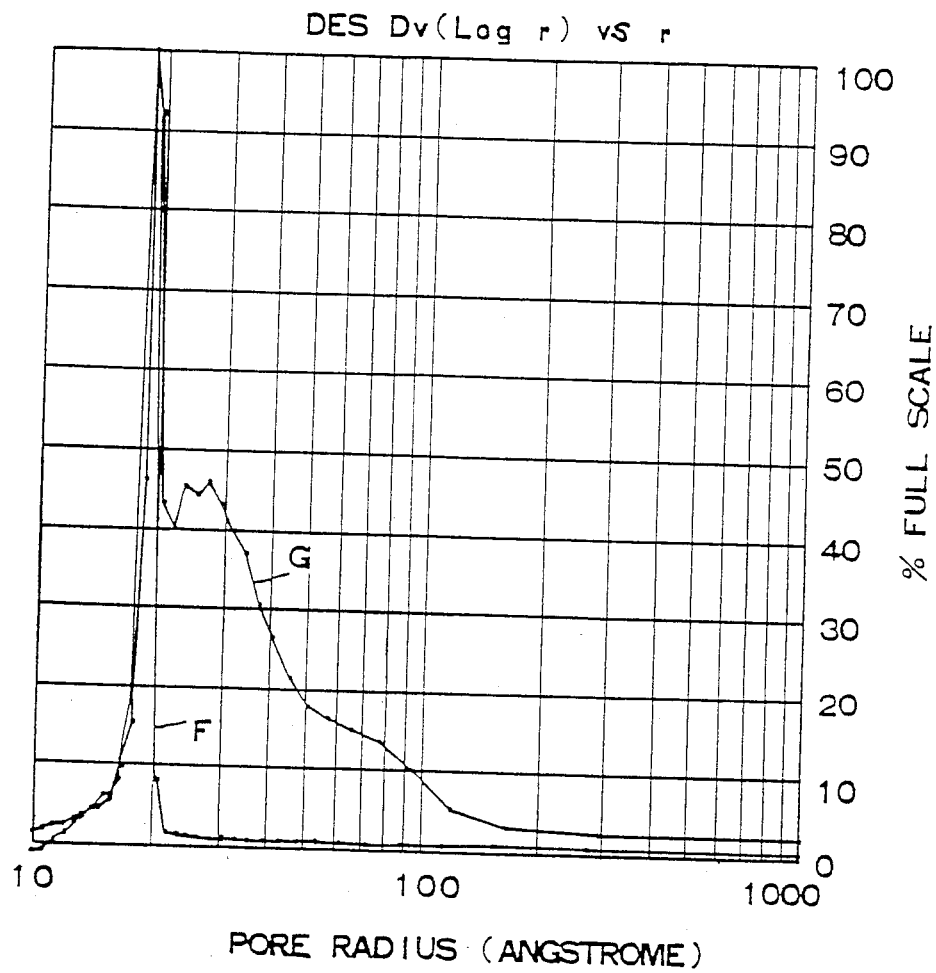
FIG. 13 is a diagram illustrating pore size distribution of the conventional nickel hydroxide powder and that according to the invention.

FIG. 13 illustrates dispersion of pore radii of the nickel hydroxide according to the conventional method and the high density active material, i.e., the nickel hydroxide, including the magnesium added thereto according to the invention for the comparison of them.

The nickel hydroxide GII according to the conventional method, is deposited by dropping the nickel sulfate solution into the alkaline solution having a high concentration, of which pH is 14.5 and the temperature is about 50° C.

This exists at a large amount in a wide range of the pore radius from 15-100 Å at the specific surface area of about 66 $m^2/g$. The particle has the pore volume of 0.136 ml/g, which is as much as 30%-40% of the particle volume (0.4 ml/g), and thus has a large void rate. In contrast to this, the nickel hydroxide F(Mg) according to the invention has the small pore volume of 0.028 ml/g, which is only a quarter of that of said particle GII. The nickel hydroxide is mixed with a small amount of powder of cobalt compound such as CoO, $\alpha\text{-Co(OH)}_2$, $\beta\text{-Co(OH)}_2$, or cobalt acetate as is done in the embodiment previously described, which produces Co(II) complex ion when dissolved in alkaline electrolyte. Then, aqueous solution including carboxymethylcellulose of 1% is added thereto to produce flowable paste liquid. A predetermined amount of this paste liquid is loaded into alkaline-proof metal fiber substrate, e.g., a nickel fiber substrate, having porosity of 95%, and nickel electrode is formed by drying the substrate after the loading.

In order to recognize the active material utilization as well as the ratio of $\gamma$-NiOOH by charge and discharge, a battery is assembled, in which this nickel electrode is used as a counter electrode to cadmium electrode with none-woven cloth polypropylene separator therebetween. The utilization of this battery has been investigated under the conditions, which are same as those previously described with reference to FIGS. 5 and 6, and the results same as those shown in FIGS. 5 and 6 are obtained.

Figure 14:
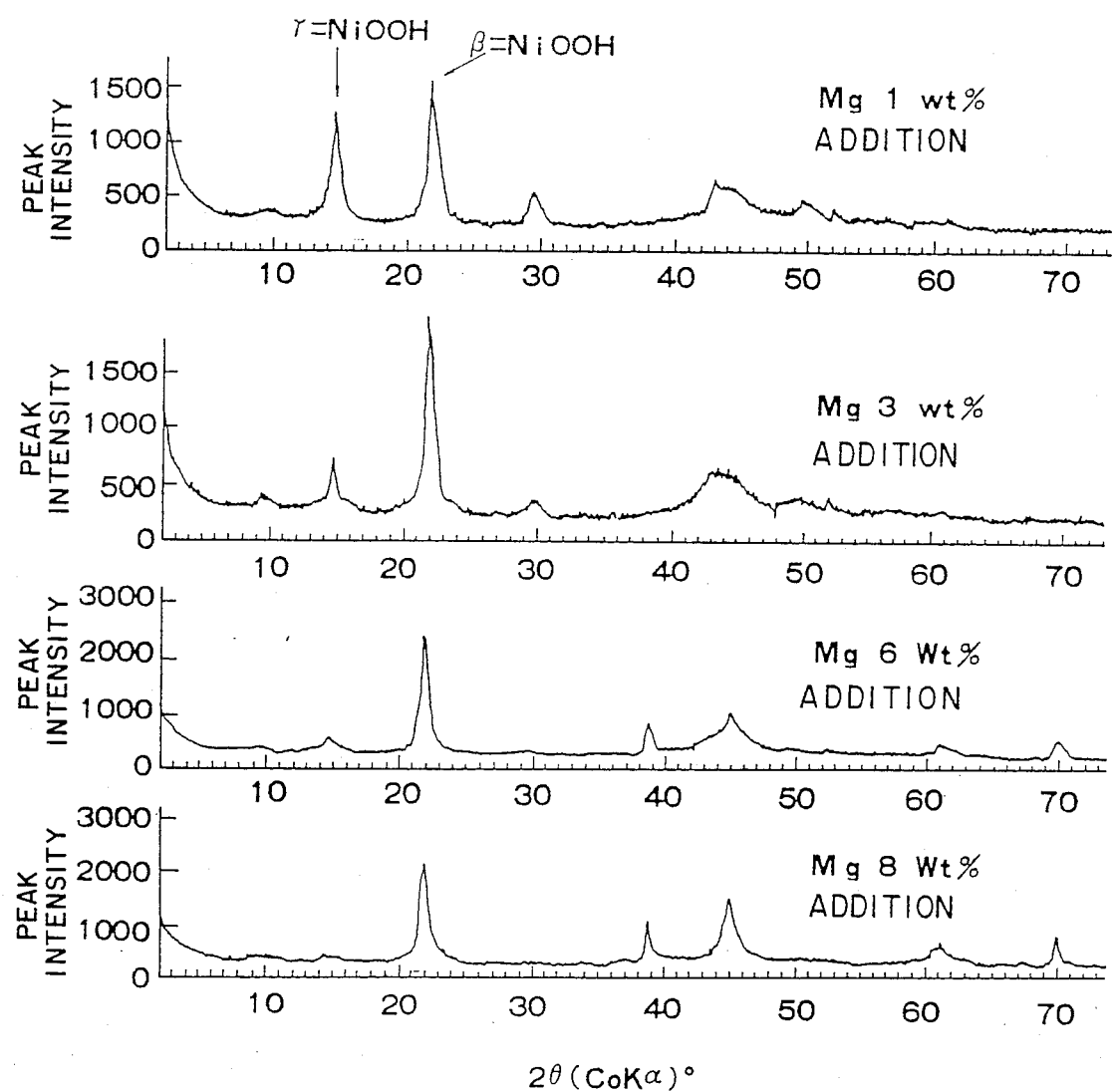
FIG. 14 is a diagram illustrating X-ray diffraction patterns at the end of the charge of various conditions of magnesium-added high density powder.

Correlation between the various conditions of nickel hydroxides and the ratio of $\gamma$-NiOOH is inspected by the X-ray analysis of the plate at the end of the charge, which has been performed at a high current density of 1C. Peak of the X-ray analysis is illustrated in FIG. 14.

Figure 15:
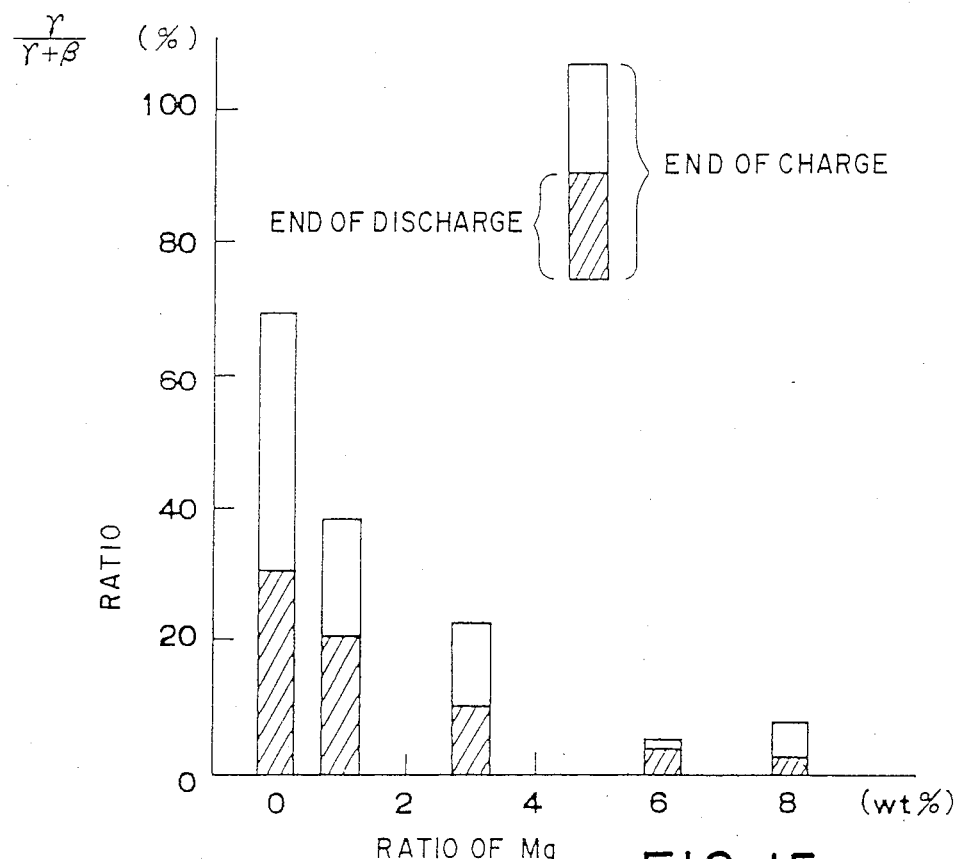
FIG. 15 is a diagram illustrating a relationship between the addition ratio of magnesium and the ratio of γ-NiOOH.
Figure 16:
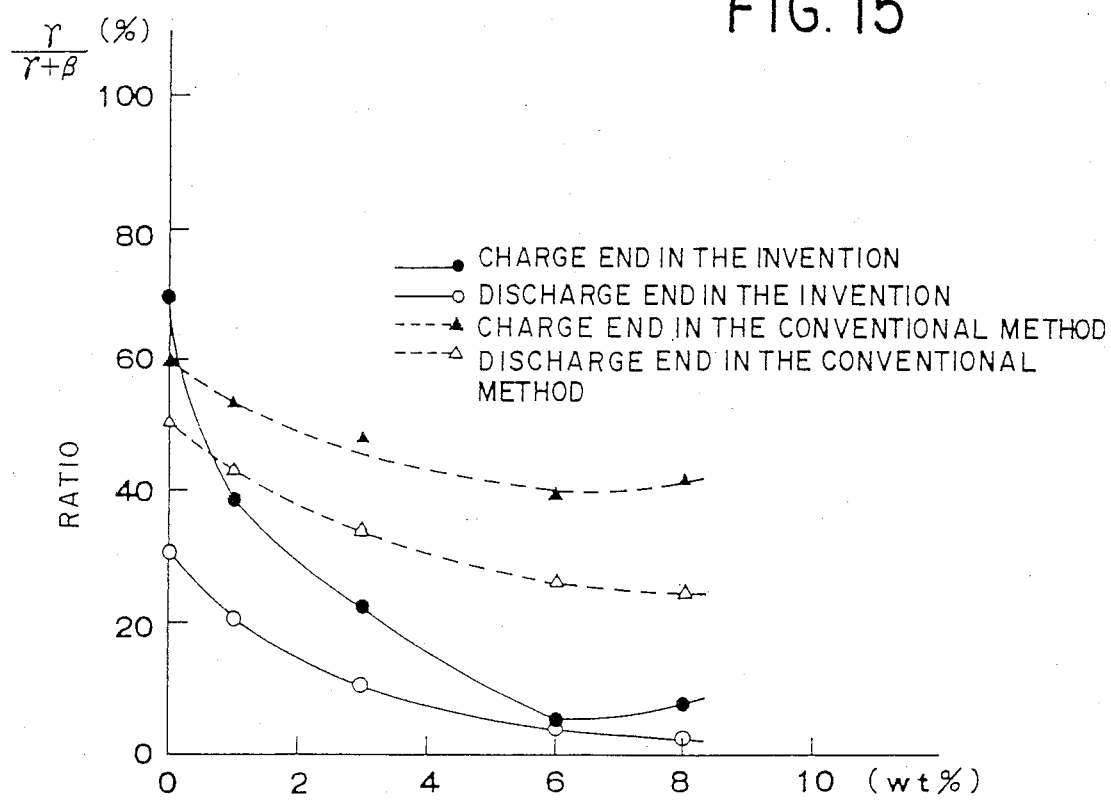
FIG. 16 is a diagram illustrating the ratio of γ-NiOOH at the end of discharge of the various conditions of nickel hydroxide.
Figure 19:
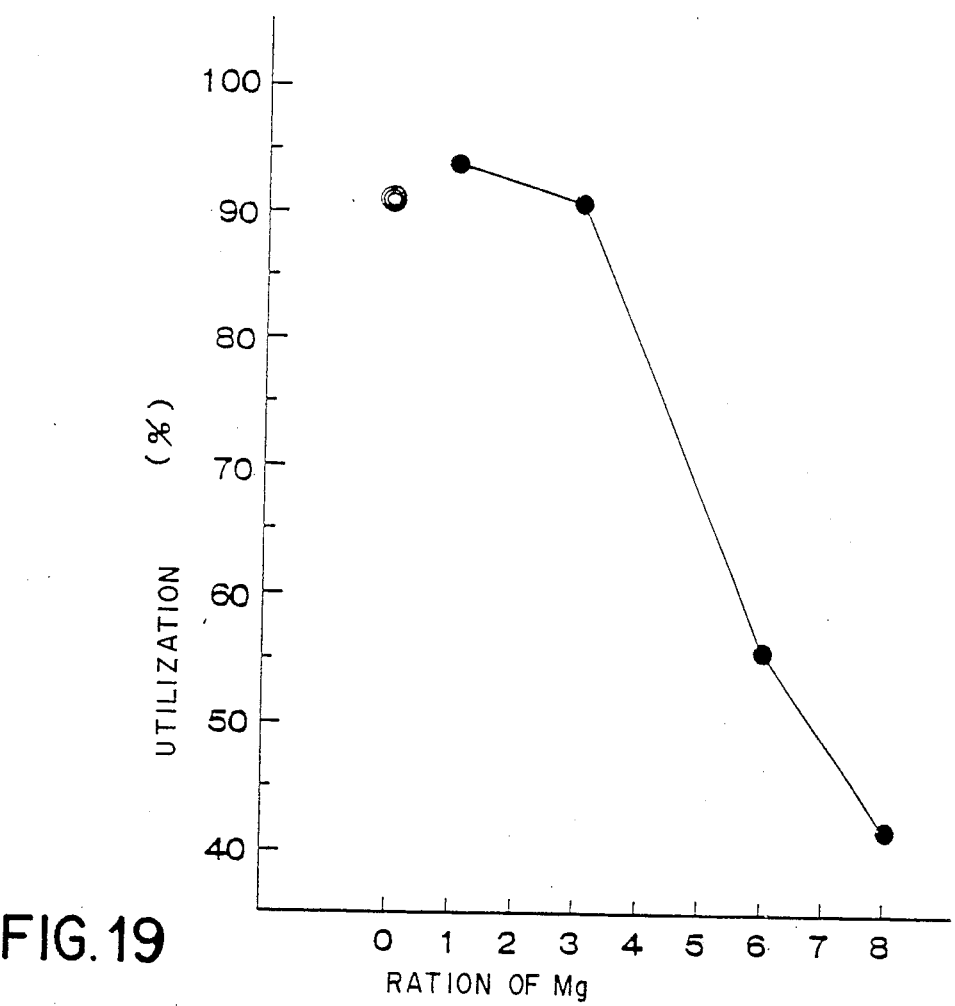
FIG. 19 is a diagram illustrating a relationship between the magnesium addition ratio and the active material utilization.

As shown in FIG. 15, when the magnesium at the solid solution is added to the crystal of the nickel hydroxide, the ratio of $\gamma$-NiOOH decreases as the amount of the additive increases.

In FIG. 17, there is shown a relationship between the ratio of $\gamma$-NiOOH in the overcharged condition and the thickness of the electrode. As the ratio of $\gamma$-NiOOH increases, the thickness of the electrode increases. Thus, in order to obtain the electrode having long useful life, it is necessary to suppress the formation of $\gamma$-NiOOH.

The addition of the magnesium can also be effective to this suppression.

Figure 20:
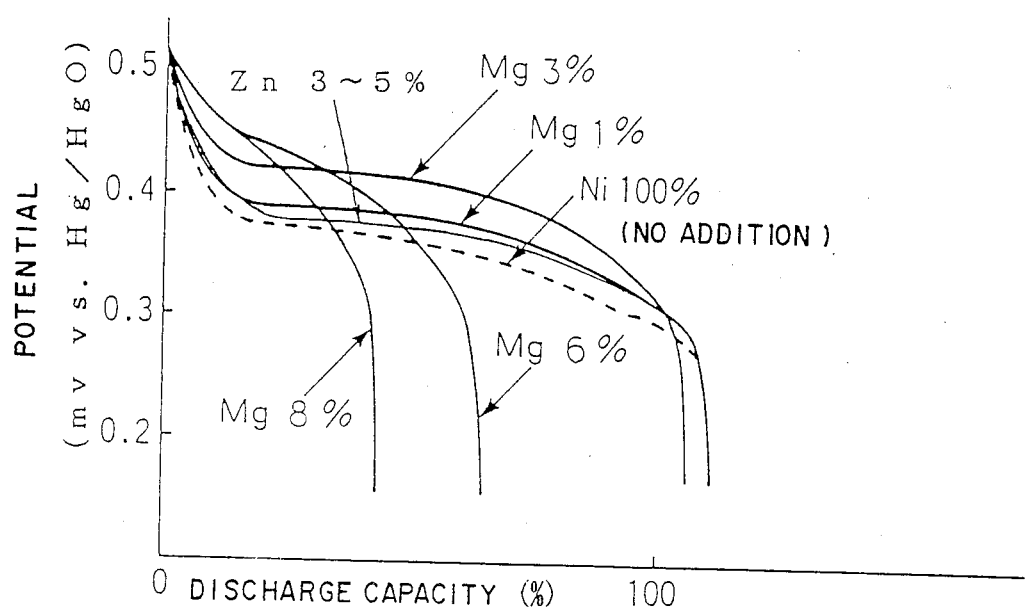
FIG. 20 is a diagram illustrating discharge potential characteristics of the electrodes including various amount of magnesium additives.

A feature of the solid solution addition of the magnesium is that the discharge potential is increased to a large extent as shown in FIG. 20. There is a tendency the the potential increases as the addition ratio increases. On the other hand, as shown in the FIG. 8, the charge potential causes a competitive reaction of oxidation of the active material and the evolution of the oxygen, resulting in reduction of the capacity, as shown in FIG. 20, so that excessive addition will cause disadvantage, which can be prevented in a range of 1-3 wt%. It is considered that the addition of the magnesium causes distorsion in the nickèl hydroxide crystal, by which the smooth diffusion of the proton in the solid phase can be achieved.

This effect of the magnesium can be maintained even if different element, e.g., cobalt, coexists in the solid solution, as is previously described with reference to FIG. 11.

Also in this second embodiment, although the metal fiber sintered material is used as the substrate, other various materials may also be used. Said effect obtained by the addition of the magnesium can also be obtained in the nickel hydroxide having the high crystallinity which is formed by various methods.

As described hereinabove, according to the invention, the density of the nickel hydroxide is increased, and the formation of $\gamma$-NiOOH, which may be caused by the increase of the density, is prevented by the additive having low toxicity. Therefore, the present invention provides the active material for the nickel electrode as well as the nickel electrode using it, which have the long useful life and the high utilization of the active material, and can also provide the alkaline battery employing them, and thus the invention has high industrial value.

What is claimed is:

1. Active material for a nickel electrode comprising:
   nickel hydroxide powder active material; and
   zinc or magnesium which is added to said active material at a rate in a range of 3-10 wt% or 1-3 wt%, respectively,
   said zinc and magnesium being in a solid solution in crystal of said nickel hydroxide, and in distribution of pore radii calculated from the a desorption side at nitrogen adsorption isotherm of said powder, development of pore having a radius of 30 Å or more being prevented, and an entire pore volume rate being controlled at 0.05 ml/g or less.

2. Active material as claimed in claim 1 wherein said active material powder, which includes nickel hydroxide and a small amount of said zinc or magnesium, is produced by deposition of sulfate solution thereof as starting material in aqueous solution having pH 11-13 controlled by caustic soda or caustic potash together with ammonium sulfate.

3. A nickel electrode comprising;
   a porous alkaline-proof metal fiber substrate used as a current collector; and
   active material for the electrode;
   said active material including;
   nickel hydroxide powder active material, to which zinc or magnesium is added at a rate in a range of 3-10 wt% or 1-3 wt%, respectively, said zinc and magnesium being in a solid solution in crystal of said nickel hydroxide; and
   said active material forming principle compound of paste, which is loaded in said electrode.

4. A nickel electrode as claimed in claim 3 wherein a small amount of cobalt in a solid solution exists in addition to said zinc or magnesium.

5. A nickel electrode as claimed in claim 3 wherein divalent cobalt compound, which forms cobalt complex ion when dissloven in alkaline aqueous solution, is added to said active material powder at a rate in a range of 5-15 wt/%.

6. A nickel electrode as claimed in claim 3 wherein conductive additives are not included, and the conductivity between said nickel fiber and particles of said active material is substantially maintained only by virtue of said cobalt compound additive.

7. An alkaline battery assembled with a nickel electrode as recited in claim 2 without formation, maintained under standing condition one or more days after supplying electrolyte therein, and initially charged after cobalt compound additive is completely dissolved and deposited.

* * * * *